US006990622B2

(12) United States Patent
Davis et al.

(10) Patent No.: US 6,990,622 B2
(45) Date of Patent: Jan. 24, 2006

(54) METHOD FOR ERROR CORRECTION DECODING IN AN MRAM DEVICE (HISTORICAL ERASURES)

(75) Inventors: James Andrew Davis, Richmond, VA (US); Jonathan Jedwab, London (GB); Kenneth Graham Paterson, Teddington (GB); Gadiel Seroussi, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 616 days.

(21) Appl. No.: 10/093,854

(22) Filed: Mar. 8, 2002

(65) Prior Publication Data

US 2003/0023911 A1 Jan. 30, 2003

Related U.S. Application Data

(63) Continuation-in-part of application No. 09/915,194, filed on Jul. 25, 2001.

(51) Int. Cl.
*G11C 29/00* (2006.01)

(52) U.S. Cl. .................. 714/763; 714/759; 714/746; 714/752

(58) Field of Classification Search .................. 714/763, 714/759, 746, 752
See application file for complete search history.

(56) References Cited

U.S. PATENT DOCUMENTS

| 4,069,970 A | 1/1978 | Buzzard et al. ............. 235/312 |
| 4,209,846 A | 6/1980 | Seppa ........................ 364/900 |
| 4,216,541 A | 8/1980 | Clover et al. ................. 371/18 |
| 4,458,349 A | 7/1984 | Aichelmann, Jr. et al. .... 371/13 |
| 4,933,940 A | 6/1990 | Walter et al. ................. 371/9.1 |
| 4,939,694 A | 7/1990 | Eaton et al. ................. 365/200 |
| 5,459,742 A | 10/1995 | Cassidy et al. ............ 371/40.1 |
| 5,488,691 A * | 1/1996 | Fuoco et al. .................... 714/52 |
| 5,502,729 A | 3/1996 | Smith, III ............. 395/182.03 |
| 5,504,760 A | 4/1996 | Harari et al. ............... 371/40.1 |
| 5,590,306 A * | 12/1996 | Watanabe et al. ........... 711/115 |
| 5,745,673 A | 4/1998 | Di Zenzo et al. ....... 395/182.05 |
| 5,848,076 A | 12/1998 | Yoshimura .................. 37/40.11 |
| 5,852,574 A | 12/1998 | Naji ........................... 365/158 |
| 5,887,270 A | 3/1999 | Brant et al. ................. 711/162 |
| 5,987,573 A | 11/1999 | Hiraka ........................ 711/156 |
| 6,166,944 A | 12/2000 | Ogino .......................... 365/97 |
| 6,279,139 B1 | 8/2001 | Vafai et al. .................. 714/763 |

(Continued)

FOREIGN PATENT DOCUMENTS

| EP | 0 494 547 A2 | 7/1992 |
| EP | 0 918 334 A2 | 5/1999 |
| EP | 1 132 924 A2 | 10/2000 |

OTHER PUBLICATIONS

Abstract of Japanese Patent No. JP 60007698, published Jan. 16, 1985, esp@cenet.com.

Peterson, W.W. and E.J. Weldon, Jr., *Error–Correcting Codes*, Second Edition, MIT Press, Ch. 1–3, 8 and 9 (1994).

*Reed–Solomon Codes and Their Applications*, S.B. Wicker and V.K. Bhargava, ed., IEEE Press, New York, Ch. 1, 2, 4 and 12 (1994).

*Primary Examiner*—Phung My Chung

(57) ABSTRACT

A magnetoresistive solid-state storage device (MRAM) employs error correction coding (ECC) to form ECC encoded stored data. ECC encoded data is read and decoded to identify failed symbols. A failure history table is then updated to indicate columns 14 of an array of storage cells 16 which are suspected to be affected by physical failures. Advantageously, erasure information is formed with reference to the failure history table, and the ability of a decoder 22 to perform ECC decoding is substantially enhanced.

10 Claims, 5 Drawing Sheets

U.S. PATENT DOCUMENTS

| | | |
|---|---|---|
| 6,430,702 B1 | 8/2002 | Santeler et al. ................ 714/6 |
| 6,456,525 B1 | 9/2002 | Perner et al. ................ 365/171 |
| 2003/0023922 A1 | 1/2003 | Davis et al. ................ 714/763 |
| 2003/0023923 A1 | 1/2003 | Davis et al. ................ 714/763 |
| 2003/0023924 A1 | 1/2003 | Davis et al. ................ 714/763 |
| 2003/0023925 A1 | 1/2003 | Davis et al. ................ 714/763 |
| 2003/0023926 A1 | 1/2003 | Davis et al. ................ 714/763 |
| 2003/0023927 A1 | 1/2003 | Jedwab et al. ................ 714/763 |
| 2003/0023928 A1 | 1/2003 | Jedwab et al. ................ 714/763 |
| 2003/0172329 A1 | 9/2003 | Davis et al. ................ 714/710 |
| 2003/0172339 A1 | 9/2003 | Davis et al. ................ 714/763 |

* cited by examiner

METHOD FOR ERROR CORRECTION DECODING IN AN MRAM DEVICE (HISTORICAL ERASURES)

This is a continuation-in-part (CIP) of co-pending U.S. patent application Ser. No. 09/915,194, filed on Jul. 25, 2001, which is incorporated herein by reference.

The present invention relates in general to a magnetoresistive solid-state storage device employing error correction coding (ECC), and in particular relates to a method for error correction decoding of ECC encoded data stored in the device.

A typical solid-state storage device comprises one or more arrays of storage cells for storing data. Existing semiconductor technologies provide volatile solid-state storage devices suitable for relatively short term storage of data, such as dynamic random access memory (DRAM), or devices for relatively longer term storage of data such as static random access memory (SRAM) or non-volatile flash and EEPROM devices. However, many other technologies are known or are being developed.

Recently, a magnetoresistive storage device has been developed as a new type of non-volatile solid-state storage device (see, for example, EP-A-0918334 Hewlett-Packard). The magnetoresistive solid-state storage device is also known as a magnetic random access memory (MRAM) device. MRAM devices have relatively low power consumption and relatively fast access times, particularly for data write operations, which renders MRAM devices ideally suitable for both short term and long term storage applications.

A problem arises in that MRAM devices are subject to physical failure, which can result in an unacceptable loss of stored data. In particular, currently available manufacturing techniques for MRAM devices are subject to limitations and as a result manufacturing yields of acceptable MRAM devices are relatively low. Although better manufacturing techniques are being developed, these tend to increase manufacturing complexity and cost. Hence, it is desired to apply lower cost manufacturing techniques whilst increasing device yield. Further, it is desired to increase cell density formed on a substrate such as silicon, but as the density increases manufacturing tolerances become increasingly difficult to control leading to higher failure rates and lower device yields. Since the MRAM devices are at a relatively early stage in development, it is desired to allow large scale manufacturing of commercially acceptable devices, whilst tolerating the limitations of current manufacturing techniques.

An aim of the present invention is to provide a method for error correction decoding of ECC encoded data stored in an MRAM device, wherein effectiveness of an ECC scheme is maximised, and/or where overhead associated with error correction coding can be reduced. A preferred aim is to provide such a method whereby a relatively large number of physical failures can be tolerated.

According to a first aspect of the present invention there is provided a method for error correction decoding of ECC encoded data stored in a magnetoresistive solid-state storage device having a plurality of magnetoresistive storage cells arranged in at least one array, the method comprising the steps of: forming a failure history identifying a storage cell or cells affected by a physical failure amongst a first set of storage cells; reading a second set of the storage cells relating to at least one block of ECC encoded data, the second set being affectable by failures occurring in the first set; forming erasure information for identifying potential errors in the at least one block of ECC encoded data, with reference to the failure history; and error correction decoding the at least one block of ECC encoded data with reference to the erasure information.

Preferably, the method also comprises the steps of identifying a failed cell or cells in the second set of storage cells which are affected by a physical failure, with reference to the error correction decoding; and updating the failure history with reference to the identified failed cell or cells from the second set.

Preferably, the method comprises providing the plurality of storage cells in at least one array of rows and columns, and forming the failure history for identifying a column or columns containing a storage cell or cells affected by a physical failure.

Here, the method preferably comprises storing the at least one block of ECC encoded data in the storage cells such that a logically sequential group of data units are stored in sets of storage cells sharing at least one column.

Preferably, the step of reading comprises generating logical values for a plurality of symbols of the block of ECC encoded data, and the step of forming erasure information comprises identifying one or more of the symbols as a potential error.

Preferably, the step of error correction decoding comprises identifying the location of zero or more errors in the at least one block of ECC encoded data, with reference to the erasure information; and replacing each identified error with a calculated correct value.

The method preferably includes the initial steps of receiving a logical unit of original information which it is desired to store in the device, encoding the original information to form a block of ECC encoded data, and storing the block of ECC encoded data in the array of storage cells. Each logical unit of original information preferably corresponds to a sector such as 512 bytes. Encoding the original information sector forms an encoded sector, which preferably comprises four codewords. Here, each codeword is preferably treated as a separate block of ECC encoded data.

According to a second aspect of the present invention there is provided a method for error correction decoding of ECC encoded data stored in a magnetoresistive solid-state storage device having a plurality of magnetoresistive storage cells arranged in rows and columns in at least one array, the method comprising the steps of: reading a first at least one block of ECC encoded data from a first set of storage cells; error correction decoding the at least one block of ECC encoded data to identify failed cells in the first set that are affected by a physical failure; forming a failure history identifying failed columns which contain the failed cells; reading a second at least one block of ECC encoded data from a second set of storage cells, the second set containing at least one storage cell having a column in common with a storage cell of the first set of storage cells; forming erasure information for identifying potential errors in the second at least one block of ECC encoded data, with reference to the failure history; and error correction decoding the second at least one block of ECC encoded data with reference to the erasure information.

According to a third aspect of the present invention there is provided a magnetoresistive solid state storage device, comprising: at least one array of magnetoresistive storage cells; a controller arranged to maintain a failure history for identifying a storage cell or cells affected by a physical failure amongst a first set of storage cells, arranged to read at least one block of ECC encoded data from a second set of the storage cells, and arranged to form erasure information for identifying potential errors in the at least one block of ECC encoded data, with reference to the failure history; and an ECC decoding unit arranged to decode the at least one block of ECC encoded data with reference to the erasure information.

The invention also extends to apparatus incorporating a magnetoresistive storage device as defined herein.

For a better understanding of the invention, and to show how embodiments of the same may be carried into effect, reference will now be made, by way of example, to the accompanying diagrammatic drawings in which.

To assist a complete understanding of the present invention, an example MRAM device will first be described with reference to FIGS. 1 and 2, including a description of the failure mechanisms found in MRAM devices. The error correction coding (ECC) encoding and decoding methods adopted in the preferred embodiments of the present invention aim to minimise the adverse effects of such physical failures and are described with reference to FIGS. 3 to 5.

Figure 1:
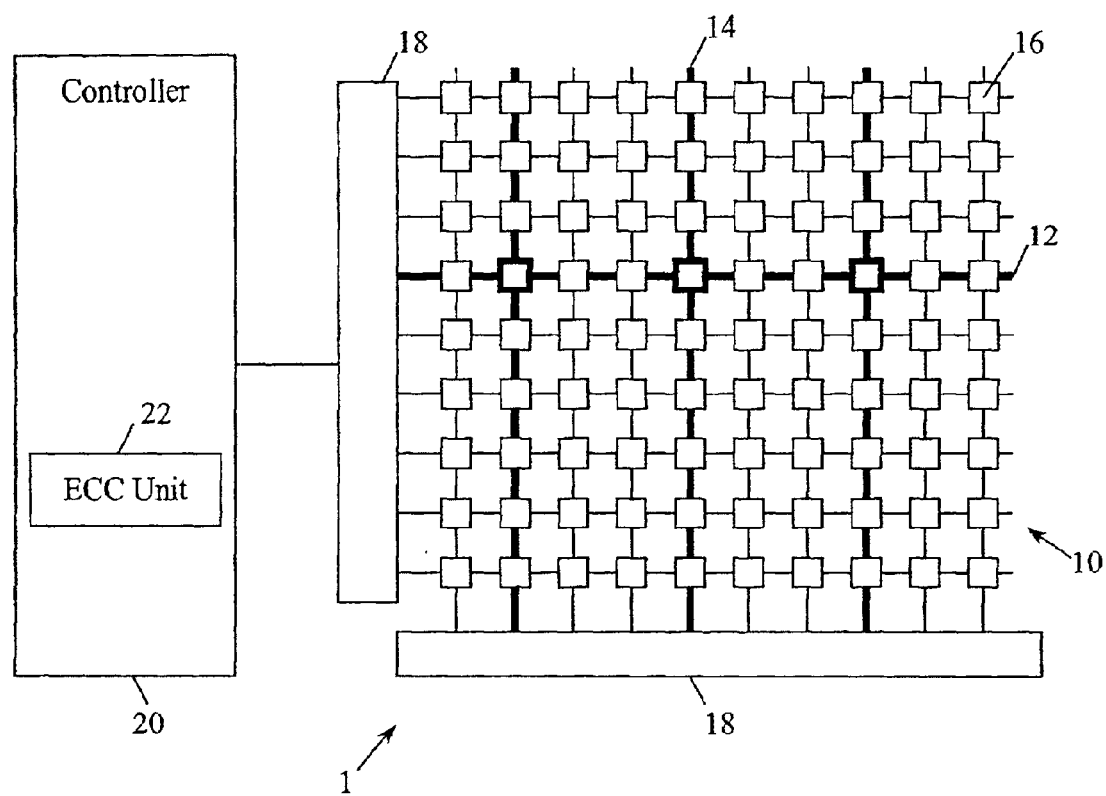
FIG. 1 is a schematic diagram showing a preferred MRAM device including an array of storage cells.

FIG. 1 shows a simplified magnetoresistive solid-state storage device 1 comprising an array 10 of storage cells 16. The array 10 is coupled to a controller 20 which, amongst other control elements, includes an ECC coding and decoding unit 22. The controller 20 and the array 10 can be formed on a single substrate, or can be arranged separately. EP-A-0 918 334 (Hewlett-Packard) discloses one example of a magnetoresistive solid-state storage device which is suitable for use in preferred embodiments of the present invention.

In the preferred embodiment, the array 10 comprises of the order of 1024 by 1024 storage cells, just a few of which are illustrated. The storage cells 16 are each formed at an intersection between control lines 12 and 14. In this example control lines 12 are arranged in rows, and control lines 14 are arranged in columns. The control lines 12 and 14 are generally orthogonal, but other more complicated lattice structures are also possible. Suitably, the row and column lines 12,14 are coupled to control circuits 18, which include a plurality of read/write control circuits. Depending upon the implementation, one read/write control circuit is provided per column, or read/write control circuits are multiplexed or shared between columns.

In a device access such as a write operation or a read operation, one row 12 and one or more columns 14 are selected by the control circuits 18 to access the required storage cell or cells 16 (or conversely one column and several rows, depending upon the orientation of the array). The selected cells 16, the selected row line 12, and the selected column lines 14, are each represented by bold lines in FIG. 1. The preferred MRAM device requires a minimum distance m, such as sixty-four cells, between the selected column lines 14 to minimise cross-cell interference. Given that each array 10 has rows of length l, such as 1024 storage cells, it is possible to access substantially simultaneously up to $l/m=1024/64=16$ cells from the array 10.

Each storage cell 16 stores one bit of data suitably representing a numerical value and preferably a binary value, i.e. one or zero. Suitably, each storage cell includes two films which assume one of two stable magnetisation orientations, known as parallel and anti-parallel. The magnetisation orientation affects the resistance of the storage cell. When the storage cell 16 is in the anti-parallel state, the resistance is at its highest, and when the magnetic storage cell is in the parallel state, the resistance is at its lowest. Suitably, the high resistance anti-parallel state defines a "0" logic state, and the low resistance parallel state defines a "1" logic state, or vice versa. In the preferred device, the resistance of each storage cell 16 is determined according to a phenomenon known as spin tunnelling and the cells are referred to as magnetic tunnel junction storage cells. The condition of the storage cell is determined by measuring the sense current (proportional to resistance) or a related parameter such as response time to discharge a known capacitance, which gives one or more parametric values for each storage cell. A logical value can then be derived from the obtained parametric value or values. Depending upon the nature and construction of the MRAM device, the read operation may comprise multiple steps or require combined read and rewrite actions.

Figure 2:
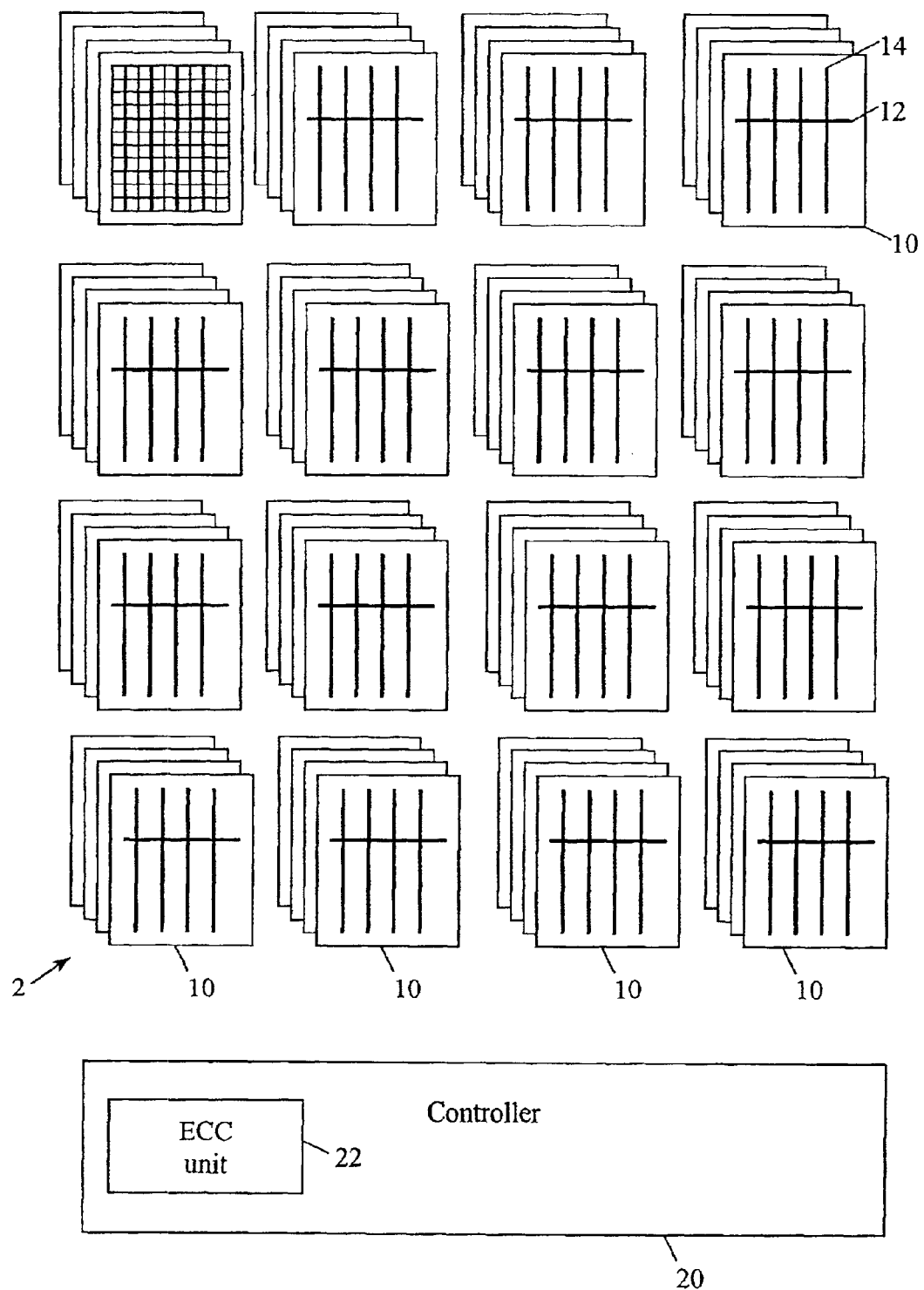
FIG. 2 shows a preferred MRAM device in more detail.

FIG. 2 shows the preferred MRAM device in more detail. A macro-array 2 is formed comprising a large plurality of individual arrays 10, each of which is formed as discussed above for FIG. 1. The use of plural arrays advantageously allows an MRAM device to be obtained of a desired overall data storage capacity, without the individual arrays 10 in themselves becoming so large that they are difficult to manufacture or control. For simplicity, FIG. 2 shows only a portion of the macro-array.

Many design choices are available to the skilled person when laying out the arrays 10 on a suitable substrate during manufacture of the device, but, amongst other concerns, it is commonly desired to reduce substrate area for each device. Conveniently, it has been found that the arrays 10 can be manufactured in layers. In an example practical device having a storage capacity of the order of 128 Mbytes, 1024 arrays are arranged in a macro-array of 16 arrays wide, by 16 arrays high, with four stack layers. In another preferred device, ECC encoded data is stored in 1280 arrays arranged 16 wide by 20 high with 4 stack layers, giving a total capacity of 160 Mbytes. Optionally, the MRAM device comprises more than one such macro-array.

As illustrated in FIG. 2, the preferred method for accessing the MRAM device 1 comprises selecting one row 12 in each of a plurality of arrays 10, and selecting plural columns 14 from each of the plurality of arrays to thereby select a plurality of storage cells 16. The accessed cells within each of the plurality of arrays correspond to a small portion of a unit of data. Together, the accessed cells provide a whole unit of data, such as a whole sector unit, or at least a substantial portion of the unit. Advantageously, each of the plurality of arrays are accessible substantially simultaneously. Therefore, device access speed for a read operation or a write operation is increased. This device access is conveniently termed a slice through the macro-array.

As shown in FIG. 2, it is convenient for the same row address and the same column addresses to be selected in each of the plurality of arrays. That is, a unit of data is stored across a plurality of arrays, using the same row and column addresses within each of the plurality of arrays.

As also shown in FIG. 2, in the preferred construction the arrays 10 are layered to form stacks. Only one array within each stack can be accessed at any one time. Therefore, it is convenient that the plurality of arrays used to store a sector unit of data are each in different stacks (i.e. none of the selected plurality of arrays are in the same stack). Also, it is convenient to select arrays which are all in the same layer. Ideally, one array is selected from each stack, the arrays each being in the same layer within each stack. In the example of FIG. 2, the topmost array within each stack has been selected.

Most conveniently, the number of arrays available in the macro-array 2 is matched to the size of a sector unit of data to be stored in the device. Here, it is convenient to provide the total number of arrays such that, given the number of cells which can be substantially simultaneously accessed in an array, a sector unit is stored using cells within all of the arrays of a single layer of the device, to store a whole sector unit of data. In other preferred embodiments, it is convenient for a reciprocal integer fraction of a sector unit of data (e.g. one half or one third or one quarter of a sector unit) to be accessible substantially simultaneously.

Although generally reliable, it has been found that failures can occur which affect the ability of the device to store data reliably in the storage cells 16. Physical failures within a MRAM device can result from many causes including manufacturing imperfections, internal effects such as noise in a read process, environmental effects such as temperature and surrounding electromagnetic noise, or ageing of the device in use. In general, failures can be classified as either systematic failures or random failures. Systematic failures consistently affect a particular storage cell or a particular group of storage cells. Random failures occur transiently and are not consistently repeatable. Typically, systematic failures arise as a result of manufacturing imperfections and ageing, whilst random failures occur in response to internal effects and to external environmental effects.

Failures are highly undesirable and mean that at least some storage cells in the device cannot be written to or read from reliably. A cell affected by a failure can become unreadable, in which case no logical value can be read from the cell, or can become unreliable, in which case the logical value read from the cell is not necessarily the same as the value written to the cell (e.g. a "1" is written but a "0" is read). The storage capacity and reliability of the device can be severely affected and in the worst case the entire device becomes unusable.

Failure mechanisms take many forms, and the following examples are amongst those identified:

1. Shorted bits—where the resistance of the storage cell is much lower than expected. Shorted bits tend to affect all storage cells lying in the same row and the same column.
2. Open bits—where the resistance of the storage cell is much higher than expected. Open bit failures can, but do not always, affect all storage cells lying in the same row or column, or both.
3. Half-select bits—where writing to a storage cell in a particular row or column causes another storage cell in the same row or column to change state. A cell which is vulnerable to half select will therefore possibly change state in response to a write access to any storage cell in the same row or column, resulting in unreliable stored data.
4. Single failed bits—where a particular storage cell fails (e.g. is stuck always as a "0"), but does not affect other storage cells and is not affected by activity in other storage cells.

These four example failure mechanisms are each systematic, in that the same storage cell or cells are consistently affected. Where the failure mechanism affects only one cell, this can be termed an isolated failure. Where the failure mechanism affects a group of cells, this can be termed a grouped failure.

Whilst the storage cells of the MRAM device can be used to store data according to any suitable logical layout, data is preferably organised into basic sub-units (e.g. bytes) which in turn are grouped into larger logical data units (e.g. sectors). A physical failure, and in particular a grouped failure affecting many cells, can affect many bytes and possibly many sectors. It has been found that keeping information about each small logical sub-unit (e.g. bytes) affected by physical failures is not efficient, due to the quantity of data involved. That is, attempts to produce a list of all such logical units rendered unusable due to at least one physical failure, tend to generate a quantity of management data which is too large to handle efficiently. Further, depending on how the data is organised on the device, a single physical failure can potentially affect a large number of logical data units, such that avoiding use of all bytes, sectors or other units affected by a failure substantially reduces the storage capacity of the device. For example, a grouped failure such as a shorted bit failure in just one storage cell affects many other storage cells, which lie in the same row or the same column. Thus, a single shorted bit failure can affect 1023 other cells lying in the same row, and 1023 cells lying in the same column—a total of 2027 affected cells. These 2027 affected cells may form part of many bytes, and many sectors, each of which would be rendered unusable by the single grouped failure.

Some improvements have been made in manufacturing processes and device construction to reduce the number of manufacturing failures and improve device longevity, but this usually involves increased manufacturing costs and complexity, and reduced device yields.

The preferred embodiments of the present invention employ error correction coding to provide a magnetoresistive solid-state storage device which is error tolerant, preferably to tolerate and recover from both random failures and systematic failures. Typically, error correction coding involves receiving original information which it is desired to store and forming encoded data which allows errors to be identified and ideally corrected. The encoded data is stored in the solid-state storage device. At read time, the original information is recovered by error correction decoding the encoded stored data. A wide range of error correction coding (ECC) schemes are available and can be employed alone or in combination. Suitable ECC schemes include both schemes with single-bit symbols (e.g. BCH) and schemes with multiple-bit symbols (e.g. Reed-Solomon).

As general background information concerning error correction coding, reference is made to the following publication: W. W. Peterson and E. J. Weldon, Jr., "Error-Correcting Codes", $2^{nd}$ edition, $12^{th}$ printing, 1994, MIT Press, Cambridge Mass.

A more specific reference concerning Reed-Solomon codes used in the preferred embodiments of the present invention is: "Reed-Solomon Codes and their Applications", ED. S. B. Wicker and V. K. Bhargava, IEEE Press, New York, 1994.

Figure 3:
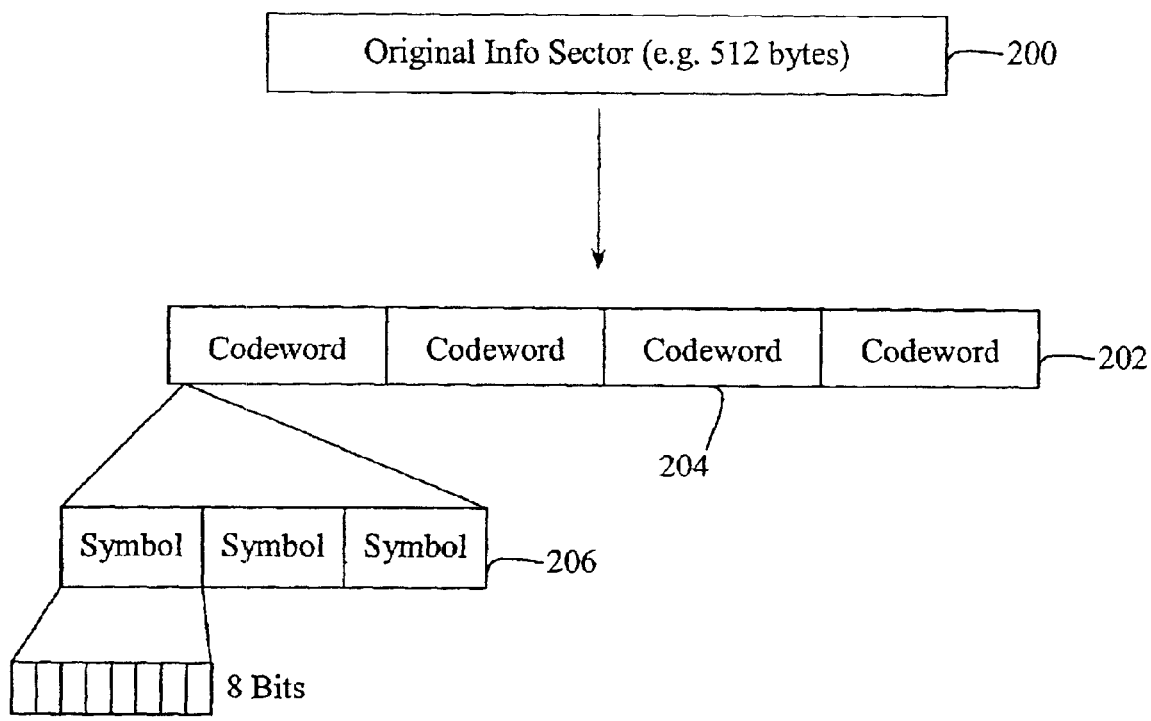
FIG. 3 shows a preferred logical data structure.

FIG. 3 shows an example logical data structure used when storing data in the MRAM device 10. Original information 200 is received in predetermined units such as a sector comprising 512 bytes. Error correction coding is performed to produce ECC encoded data, in this case an encoded sector 202. The encoded sector 202 comprises a plurality of symbols 206 which can be a single bit (e.g. a BCH code with single-bit symbols) or can comprise multiple bits (e.g. a Reed-Solomon code using multi-bit symbols). In the preferred Reed-Solomon encoding scheme, each symbol 206 conveniently comprises eight bits and, as shown in FIG. 3, each encoded sector 202 comprises four codewords 204, each comprising of the order of 144 to 160 symbols. The eight bits corresponding to each symbol are conveniently stored in eight storage cells 16, which can be termed a symbol group. A physical failure which directly or indirectly affects any of these eight storage cells in a symbol group can result in one or more of the bits being unreliable (i.e. the wrong value is read) or unreadable (i.e. no value can be obtained), giving a failed symbol.

In the current MRAM devices, grouped failures tend to affect a large group of storage cells, sharing the same row or column. This provides an environment which is unlike prior storage devices. The preferred embodiments of the present invention employ an ECC scheme with multi-bit symbols. Where manufacturing processes and device design change over time, it may become more appropriate to organise storage locations expecting bit-based errors and then apply an ECC scheme using single-bit symbols, and at least some of the following embodiments can be applied to single-bit symbols.

Error correction decoding each block of stored ECC encoded data allows failed symbols 206 to be identified and corrected. Conveniently, decoding is performed independently for each block of ECC encoded data, such as an ECC encoded sector 202 or, in the preferred embodiment, for each codeword 204. Hence, the encoded sector 202, or preferably each ECC codeword 204, forms the unit of data to be stored in the device.

The preferred Reed-Solomon scheme is an example of a linear error correcting code, which mathematically identifies and corrects completely up to a predetermined maximum number of failed symbols 206 within each independently decodeable block of ECC encoded data, depending upon the power of the code. For example, a [160,128,33] Reed-Solomon code producing codewords having one hundred and sixty 8-bit symbols corresponding to one hundred and twenty-eight original information bytes and a minimum distance of thirty-three symbols can locate and correct up to sixteen symbol errors.

Suitably, the ECC scheme employed is selected with a power sufficient to recover original information 200 from the encoded data in substantially all cases. Pictorially, each perfect block of ECC encoded data represents a point in space, and a reliably correctable form of that block of ECC encoded data lies within a "ball" having a radius corresponding to the maximum power of the ECC encoding scheme. Very rarely, a block of encoded data is encountered which is affected by so many failures that the original information 200 is unrecoverable. Here, the ECC decoding unit 22 is presented with a block of ECC encoded data which is so severely affected by physical failures that it lies outside the ball of all reliably correctable blocks of ECC encoded data. Also, even more rarely, the failures result in a mis-correct, where information recovered from the encoded data 202 is not equivalent to the original information 200. Even though the recovered information does not correspond to the original information, a mis-correct is not readily determined. Pictorially, the ECC decoding unit 22 is presented with a block of ECC encoded data which is so severely affected by physical failures that it lies inside an incorrect ball, i.e. not the ball corresponding to the perfect form of that block of ECC encoded data. Ideally, the ECC scheme is selected such that the probability of encountering an unrecoverable or mis-corrected block of ECC encoded data is extremely small, suitably of the order of $10^{-15}$ to $10^{-20}$.

It is desired to minimise the probability that original information is unrecoverable from a block of stored encoded data or that a mis-correct occurs. Therefore, the preferred embodiments of the invention aim to improve effective use of an error correction coding scheme, as will be described below.

Figure 4:
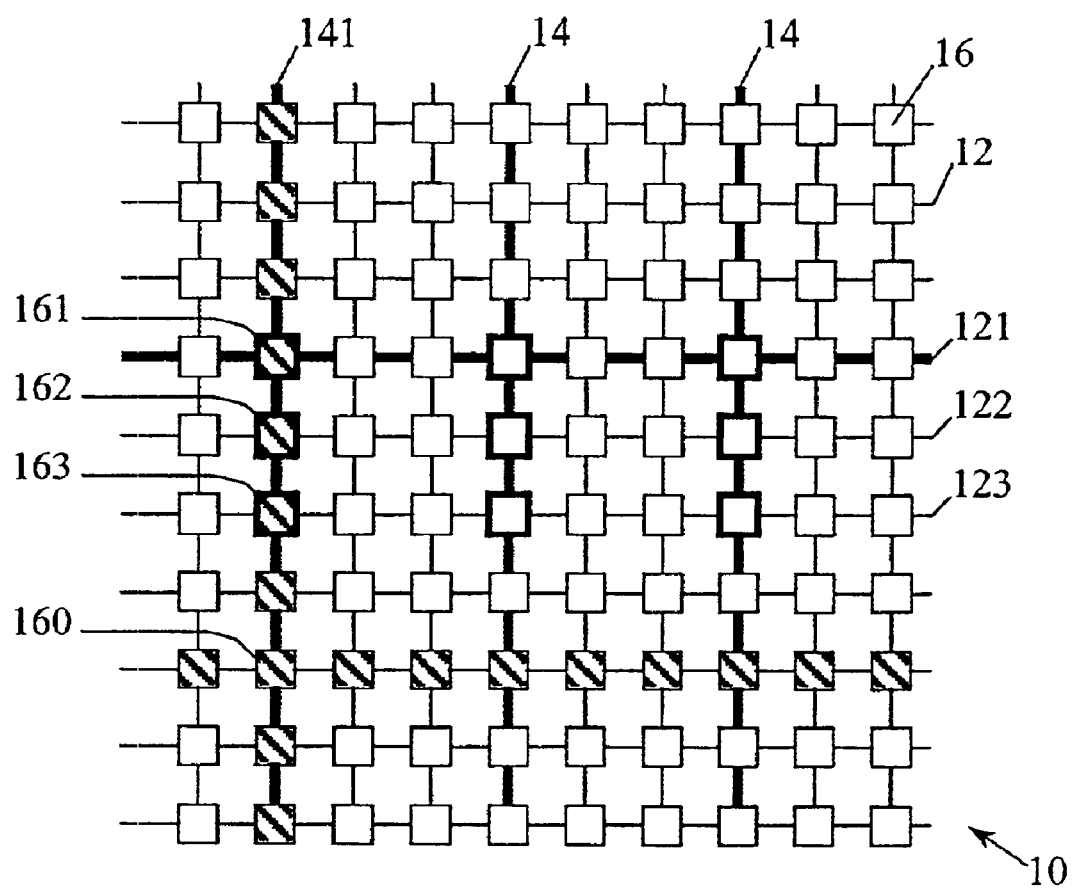
FIG. 4 shows a portion of an array including a test row.

FIG. 4 shows schematically a portion of an array 10, similar to the array described above with reference to FIG. 1. In FIG. 4, a first row 121 includes a set of storage cells which are used to store data corresponding to a first logical unit of data, such as part of a codeword 204 or part of an ECC encoded sector 202. A second row 122 similarly contains storage cells which are used to store part of a second logical unit of data and, for illustration, a third row 123 containing a third set of storage cells again containing part of a third logical unit of data. The rows are shown as being immediately adjacent, but could be spaced further apart.

It has been found convenient to use a set of columns 14 which are shared between the selected cells in the rows 121, 122 and 123 of interest. During a read operation relating to the first logical unit of data, the first row 121 and one or more columns 14 are activated to select the first set of storage cells 16 within the array 10, shown in bold lines in FIG. 4. The selected columns here are shown closely adjacent, for ease of illustration.

In FIG. 4, a grouped failure such as a shorted-bit failure or open-bit failure has been caused by cell 160 and affects a row and column of cells, shown with a shaded pattern. This failure may adversely affect the reliability of the logical values stored in those cells, which in turn may lead to incorrect data being read from the device. These failed cells include cell 161 in the first row 161, cell 162 in the second row 122, and cell 163 in the third row. Hence it is desired to predict the location of the failed cells, and to use this prediction to enhance subsequent stages of a read operation. In particular, such prediction provides erasure information that allows a greater number of errors in the stored data to be identified and corrected.

Figure 5:
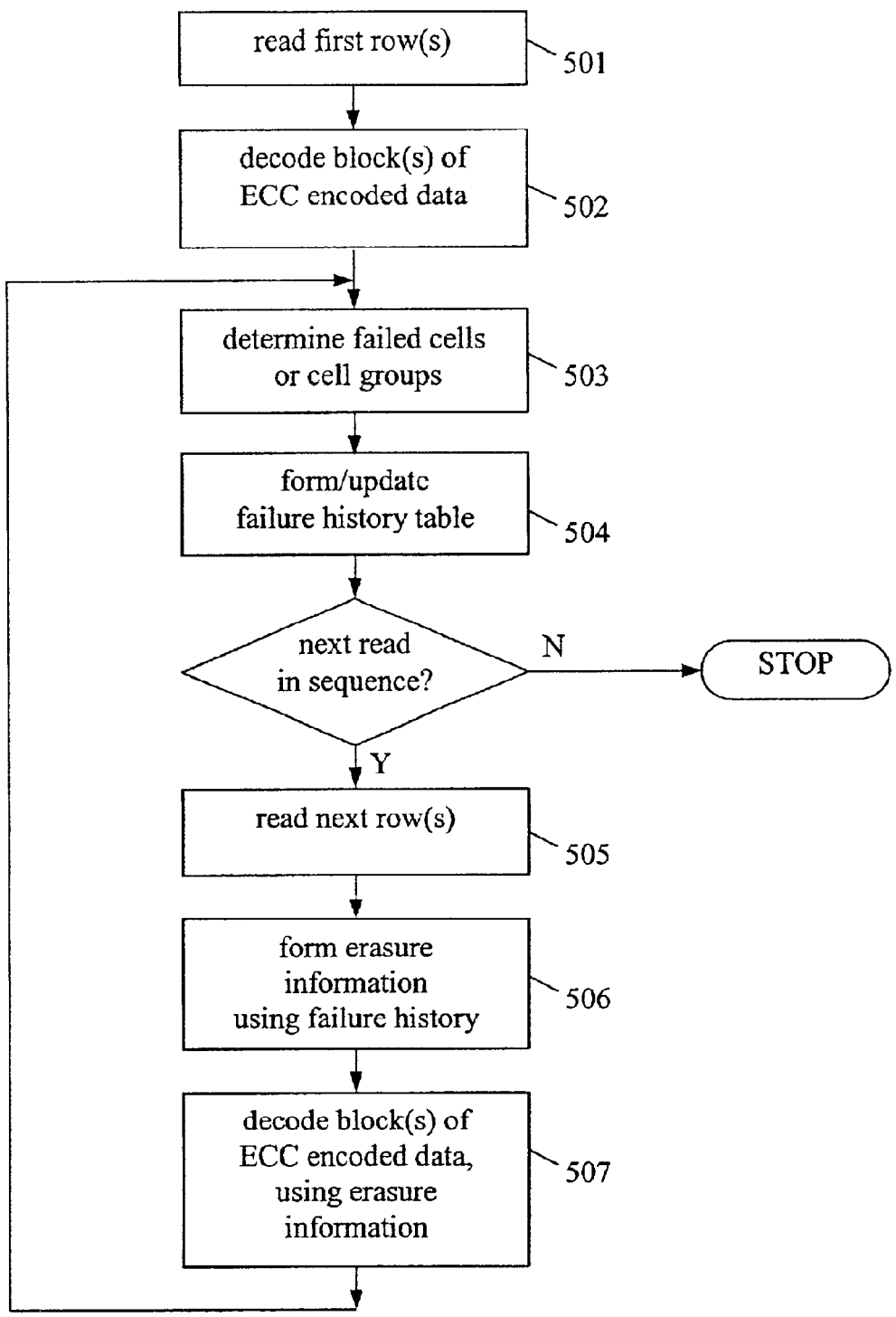
FIG. 5 shows a preferred method for decoding ECC encoded data stored in the device.

FIG. 5 shows a preferred method for decoding of ECC encoded data stored in an MRAM device. Preferably, the MRAM device is configured as discussed above in FIGS. 1, 2 and 4, and the stored data is error correction encoded into a format as shown in FIG. 3.

Step 501 comprises reading logical values from a set of storage cells 16 selected from a first row 121 of an array 10. The selected cells can correspond to any suitable unit of data. Here, depending upon the nature of the data storage layout employed, it may be necessary to access a plurality of rows in the array, or to access one or more rows in each of a plurality of arrays. In the preferred embodiments, the selected cells correspond to one or more symbol groups which together provide symbol values for one or more blocks of ECC encoded data, such as one or more codewords 204 or one or more complete encoded sectors 206.

The read process conveniently comprises obtaining parametric values relating to the selected set of storage cells 16, such as one or more parametric values obtained from a sense current and representing cell resistance or response time. In one embodiment, the sensed parametric values are compared against a simple threshold, and a logical value is derived such as a binary 1 or 0 depending on whether the sensed parametric values are above or below the threshold, respectively. In other embodiments, a more sophisticated comparison may be made such as identifying a range or ranges considered reliable, and treating the cell as unreadable if the obtained parametric values lie outside this range or ranges. Optionally, this read process is repeated, in the hope of avoiding a transient or random error. However, particularly with currently available MRAM devices, a small number of systematic failures are to be expected when accessing any significant number of storage cells, such as the set of storage cells corresponding to an ECC codeword 204 or an encoded sector 202.

Step 502 comprises decoding the block or blocks of ECC encoded data, involving the logical values obtained in step 501. This decoding step is suitably performed by the decoding unit 22.

Step 503 comprises comparing a decoding output from the ECC decoding unit 22, against the ECC encoded data read from the device, in order to determine failed cells amongst the selected cells in the first row 121. Conveniently, the failed cells are identified on the basis of a symbol group. That is, any symbol in the ECC encoded data which led to a correction in the decoding step 502 is identified, and the corresponding symbol group determined to contain one or more failed cells. Depending upon the ECC encoding scheme employed, it may not be possible to identify individual failed cells, and hence all of the cells within that group are considered to be potential failures.

Step 504 comprises forming (or updating) a failure history which records the column or columns 14 relating to the identified failed cells from step 504. The failure history is suitably recorded in a failure history table, which is managed by the controller 20 or other unit, in cooperation with the ECC unit 22.

At this stage in the simplified example embodiment, the failure history is based on information obtained from the steps just described in relation to the first row 121. Referring again to FIG. 4, a failed cell 161 is present amongst the cells selected in the first row 121. Where the effect of this failed cell 161 is identified, the failure history records that the corresponding column 141 may have been affected by a failure, particularly a grouped-type failure such as a shorted-bit or open-bit failure. Where failures can only be attributed to a set of cells, such as a symbol group, then all columns relating to that symbol group are marked in the failure history table as potentially being affected by failures, since at this stage it is not known which particular cell or cells were responsible for the failed symbol.

Step 505 comprises reading logical values from a selected set of cells from a second row 122 (or a second set of rows), the selected set of cells sharing at least one column with the set of cells from the first row 121 (or first set of rows) from step 501. Conveniently, a data storage layout is employed such that all of the columns 14 appropriate to the selected set of cells in the first row 121, will be accessed again for the selected set of cells in the second row 122. Further, the data storage layout conveniently places units of data that are likely to be accessed in sequence (such as consecutive sectors) into sets of cells which share columns, such that the failure history derived from the first data unit stored in the first row or rows 121 can be applied to the second data unit stored in the second row or rows 122. For example, data from a large source file is stored across several consecutive sectors arranged with shared columns and so these sectors will be read in a sequence to recover the stored source file.

Step 506 comprises forming erasure information for the block or blocks of ECC encoded data, with reference to the failure history. That is, the failure history table is used as a reference to columns of cells which are identified as potentially being affected by physical failures. Where those same columns are used in a subsequent read operation, the nature of grouped-type failures in an MRAM device indicate that a failure is likely to be encountered again. Hence, a cell or group of cells affected by a failure can be predicted by referring to the failure history table.

In the example embodiment shown in FIG. 4, the failure history table formed with respect to the first row 121 indicates that column 141 of cell 161 is possibly affected by a physical failure. Hence, the failure history can be used to predict that the cell 162 in row 122 also lying in the column 141 is also possibly affected by a failure.

The logical values and the erasure information can be presented in any suitable form. In one example, hard decisions are made as to the predicted reliability or unreliability of each selected storage cell (or group of cells) and erasure information is generated accordingly. In a second example, soft decisions are made as to the relative certainty with which erasure information is generated, such as by placing the predicted failures in order of quality. Here, the decisions can take account of the nature of failures found in the preferred MRAM devices. These failure mechanisms may include both random failures and systematic failures. In particular, it is desired to distinguish between isolated failed cells, and grouped-type failures such as shorted-bit and open-bit failures. Where a column has only a short history then a failure can be predicted with only modest certainty (e.g. where only one previous result is available). Also, a pattern of intermittent failures interspersed with non-failures leads to inconclusive results. However, a column with a long history of failures (e.g. where two, three or more consistent previous results are available) can be predicted to be a failure this time with a high degree of certainty. Ideally, the logical symbol values and the erasure information are arranged to form an input (or inputs) to the ECC decoder 22.

It is convenient to prepare the erasure information in parallel with generating the logical bit values. In the currently preferred embodiments, each storage cell 16 stores a single logical bit value representing a binary 1 or 0, and multiple bits are gathered together to form a symbol 206. Preferably, the erasure information is prepared on the basis that a symbol 206 is declared as an erasure where any one or more of the cells in a symbol group storing that symbol are predicted to be a failed storage cell (i.e. lies in a failed column).

Step 507 comprises error correction decoding the block of stored ECC encoded data, using the symbol logical values read from the device and taking account of the erasure information stored in the failure history table. In the preferred ECC coding scheme, each codeword 204 is decoded in isolation, and the results from ECC decoding plural codewords (in this case four codewords) provides ECC decoded data corresponding to the original information sector 200. As will be familiar to those skilled in the field of ECC, available error correction codes allow a predetermined number of full errors to be corrected (i.e. where the location of a symbol error is unknown and the symbol value is unknown), and twice that predetermined number of erasures (i.e. where the location of a symbol error is known and just the symbol value remains unknown) or a combination of the two. For example, the preferred [160,128,33] Reed-Solomon code is mathematically able to correct up to sixteen full errors or up to thirty-two erasures (or a combination, such as twenty erasures and six full errors). Advantageously, the error correction decoding is able to correct a greater number of errors using the generated erasure information, compared with a situation where this erasure information is not available.

At this point, the method conveniently returns to the step 503 such that failed cells are determined using the results of decoding the block or blocks of ECC encoded data, and the results of decoding the block of ECC encoded data corresponding to the second row 122 are used to determine potential failures in the selected cells in the second row, and this information is added to the history information record. The entry for row 122 will tend to reinforce, or possibly to contradict, the previous entry with respect to row 121. In the example shown in FIG. 4, one of the selected cells 162 in the second row 122 has been determined as being affected by a failure, and this reinforces the results obtained previously concerning cell 161 in row 121. Hence, there is now a greater degree of certainty that all of the cells in column 141 will be affected by some form of grouped failure. The history information record preferably indicates a level of certainty, based on the number of times in which a particular column has been accessed and found to be affected by failures. When a set of storage cells in the third row 123 is read, erasure information is formed from the failure history table, with the benefit of failure history derived both from the first row 121 and from the second row 122.

The failure history is suitably retained for a relatively short period of time, in order to avoid a build-up of large quantities of stored overhead. Preferably, the failure history is created and maintained while a related sequence of data units are read from the device, such as a set of consecutive sectors. Once the sequence has been read and is no longer of current interest, the failure history is discarded. A new failure history is created each time a portion of the device is accessed, and kept only for the period when access to that data is of current interest. Therefore, access to data stored in physically adjacent locations, i.e. using a consistent set of columns, produces a short-term failure history which improves error correction decoding of the stored data, whilst avoiding excessive failure history overhead.

Step 502 and step 507 suitably each comprises providing an output from the decoding operation as recovered information. In the preferred embodiment, the power of the error correction coding scheme is chosen to balance an overhead of the ECC scheme against the probability of encountering failed symbols. In substantially all practical cases the number of failures is within the power of the decoder to correct, and the original information 200 is recovered and output. The loss of original information due to an unrecoverable or mis-corrected block of stored encoded data is very rare.

Ideally, each unit of data (e.g. a codeword or ECC encoded sector) is stored with a few sub-units (e.g. bytes or symbols) in each of a large plurality of the arrays 10. Therefore, a failure (especially a grouped failure) in any one array affects only a small portion of the data unit. Further, data storage layouts can be employed to minimise the effect of those failures on the stored ECC encoded data. The preferred data storage layouts include storing all bits of each symbol in storage cells 16 in one row 12, or in at least two rows 12 but using storage cells 16 in the same columns 14. In other embodiments, sets of bits taken from each row 12 are allocated to different codewords and the order of allocation can be rotated. A second level of error checking can be applied by adding a parity bit to each symbol.

The method discussed above is particularly useful in determining some forms of grouped failures, such as shorted-bit failures and open-bit failures in MRAM devices. By contrast, an isolated systematic failure such as a half-select bit is not so relevant. However, combining the use of failure history with error correction coding provides a practical device which is able to take advantage of the considerable benefits offered by the new MRAM technology whilst minimising the limitations of current manufacturing techniques.

The MRAM device described herein is ideally suited for use in place of any prior solid-state storage device. In particular, the MRAM device is ideally suited both for use as a short-term storage device (e.g. cache memory) or a longer-term storage device (e.g. a solid-state hard disk). An MRAM device can be employed for both short term storage and longer term storage within a single apparatus, such as a computing platform.

A magnetoresistive solid-state storage device and methods for controlling such a device have been described. Advantageously, the storage device is able to tolerate a relatively large number of errors, including both systematic failures and transient failures, whilst successfully remaining in operation with no loss of original data, through the use of error correction coding. Simpler and lower cost manufacturing techniques are employed and/or device yield and device density are increased. Error correction coding and decoding allows blocks of data, e.g. sectors or codewords, to remain in use, where otherwise the whole block must be discarded if only one failure occurs. Advantageously, generating erasure information allows significantly improved error correction decoding. Error correction overhead in the stored encoded data can be reduced and/or more powerful error correction can be obtained for the same overhead.

What is claimed is:

1. A method for error correction decoding of ECC encoded data stored in a magnetoresistive solid-state storage device having a plurality of magnetoresistive storage cells arranged in at least one array, the method comprising the steps of:

forming a failure history identifying a storage cell or cells affected by a physical failure amongst a first set of storage cells;

reading a second set of the storage cells relating to at least one block of ECC encoded data, the second set being affectable by failures occurring in the first set;

forming erasure information for identifying potential errors in the at least one block of ECC encoded data, with reference to the failure history; and error correction decoding the at least one block of ECC encoded data with reference to the erasure information.

2. The method of claim 1, comprising:

identifying a failed cell or cells in the second set of storage cells which are affected by a physical failure, with reference to the error correction decoding; and updating the failure history with reference to the identified failed cell or cells from the second set.

3. The method of claim 1, comprising providing the plurality of storage cells in at least one array of rows and columns, and forming the failure history for identifying a column or columns containing a storage cell or cells affected by a physical failure.

4. The method of claim 3, comprising storing the at least one block of ECC encoded data in the storage cells such that a logically sequential group of data units are stored in sets of storage cells sharing at least one column.

5. The method of claim 1, wherein the step of reading comprises generating logical values for a plurality of is symbols of the block of ECC encoded data, and the step of forming erasure information comprises identifying one or more of the symbols as a potential error.

6. The method of claim 1, wherein the step of error correction decoding comprises identifying the location of zero or more errors in the at least one block of ECC encoded data, with reference to the erasure information; and replacing each identified error with a calculated correct value.

7. The method of claim 1, further comprising the steps of:

encoding a logical unit of original information to form at least one block of ECC encoded data; and storing the block or blocks of ECC encoded data in the array of storage cells;

wherein the decoding step attempts to recover the logical unit of original information from the stored block or blocks of ECC encoded data.

8. A method for error correction decoding of ECC encoded data stored in a magnetoresistive solid-state storage device having a plurality of magnetoresistive storage cells arranged in rows and columns in at least one array, the method comprising the steps of:

reading a first at least one block of ECC encoded data from a first set of storage cells;

error correction decoding the at least one block of ECC encoded data to identify failed cells in the first set that are affected by a physical failure;

forming a failure history identifying failed columns which contain the failed cells;

reading a second at least one block of ECC encoded data from a second set of storage cells, the second set containing at least one storage cell having a column in common with a storage cell of the first set of storage cells;

forming erasure information for identifying potential errors in the second at least one block of ECC encoded data, with reference to the failure history; and error correction decoding the second at least one block of ECC encoded data with reference to the erasure information.

9. A magnetoresistive solid state storage device, comprising:

at least one array of magnetoresistive storage cells;

a controller arranged to maintain a failure history for identifying a storage cell or cells affected by a physical failure amongst a first set of storage cells, arranged to read at least one block of ECC encoded data from a second set of the storage cells, and arranged to form erasure information for identifying potential errors in the at least one block of ECC encoded data, with reference to the failure history; and an ECC decoding unit arranged to decode the at least one block of ECC encoded data with reference to the erasure information.

10. An apparatus incorporating a magnetoresistive storage device according to claim 9.

* * * * *